Dec. 27, 1960  P. C. VAN DER WILLIGEN ET AL  2,966,433
METHOD OF PRODUCING A SLAG-FORMING MASS
Filed Dec. 17, 1956
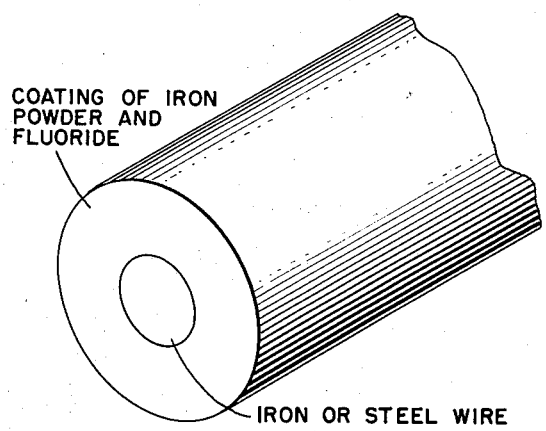
INVENTOR
PAUL CHRISTIAAN VAN DER WILLIGEN
SJERP ANNE TROELSTRA
BY
AGENT

2,966,433

METHOD OF PRODUCING A SLAG-FORMING MASS

Paul Christiaan van der Willigen and Sjerp Anne Troelstra, both of Eindhoven, Netherlands, assignors, by mesne assignments, to North American Philips Company, Inc., New York, N.Y., a corporation of Delaware Filed Dec. 17, 1956, Ser. No. 628,918

Claims priority, application Netherlands Dec. 15, 1955

8 Claims. (Cl. 148—26)

This invention relates to a slag-forming mass for use with welding electrodes of the type used in electric arc welding of iron and iron alloys.

It is known to mix minerals, metal alloys metals and other chemicals to form a slag during a welding operation, the slag protecting the liquid metal from air. Such mixtures may be composed of powders which are caused to cohere by a binder and which are shaped in a form adapted to the welding method in which the mixture is used. These mixtures may be a granular, slag-forming mass which covers the welding area between the bare wire, rod or disc and the object to which the wire, rod or disc is to be welded to, or in the alternative, a coating applied to said wire, rod or disc.

A slag-forming mass containing magnesium fluoride or another alkaline-earth fluoride is often used for welding iron and iron alloys. The binder used is waterglass which is mixed as a syrupy solution in water with the pulverulent slag-forming substances and is subsequently dried after the mixture thus obtained has been molded.

The use of lacquers, resins, gums, glues and the like as a binder is not practical since these substances are more costly than waterglass and are decomposed at the temperatures at which the coatings are heated during welding.

In accordance with the present invention a slag-forming mass, free of waterglass, has been made containing a colloidal gel of a fluoride of magnesium, calcium or strontium as a binder. This gel is obtained by coagulating an aqueous dispersion of a fluoride of magnesium, calcium or strontium with a small quantity of metal ions capable of replacing the magnesium, calcium or strontium ions within or at the surface of the crystal lattice of these fluorides. The metal ions most suitable for this purpose are the alkaline earth metal ions identical with the alkaline earth metal ions already present in the alkaline earth fluoride lattice. Thus in order to form a gel of calcium fluoride use is made of calcium ions; for magnesium fluoride use is made of magnesium ions, and for strontium fluoride use is made of strontium ions.

In accordance with an alternative form of the invention, other metal ions which are capable of forming mixed crystals with the fluoride employed or of being incorporated into the surface of the crystal lattice in a manner similar to that of the alkaline earth metal ion already present. Examples of these metal ions are alkaline earth metal ions such as calcium, magnesium, and strontium which differ from the alkaline earth metal ions already present in the fluoride lattice or a metal ion selected from the group consisting of cadmium, zinc and copper ions.

The aforesaid metal ions are used in the form of aqueous solutions of water soluble salts of the ions. Examples of which are the chlorides, bromides and nitrates.

The quantities of such salts required to obtain a gel need not be large. It is usually sufficient to use such amounts of these salts so that their metal ions are equal to about 10% by weight of the metal ions present in the fluoride. The quantity of water in which the fluoride is suspended may be small. The most suitable concentration of solids is usually between 40 and 80%. In this case, consistency of the gel obtained varies between that of soft vaseline and that of lubricating grease used for lubricating shafts.

In order to secure satisfactory coagulation soluble salts not required for converting the fluoride into gel should be excluded from the slag-forming mass. Consequently the starting material used for the binder should preferably be produced in the absence of metal salts or else the alkali metal salts should be removed as much as possible during or prior to the production of the binder.

Suitable starting products for the production of the binder used in the slag-forming mass according to the invention are obtained, for example, by dividing finely finely ground fluorspar in water, or else by producing the fluoride by causing an equivalent quantity of hydrofluoric acid to act upon a pulverulent carbonate or hydroxide of the metal from which the desired metal is to be obtained.

In accordance with the invention it has furthermore been found that alkali metal salts and, more particularly, potassium salts produce a reduction of the viscosity of the slag, which is obtained if use is made of the type of slag-forming masses now in use. This reduction of the viscosity of the slag causes an inadequate coating of the welding bead by the slag. However, as long as waterglass was used in practice as a binder, the said disadvantage could not be obviated. The present invention, however, omits waterglass from the slag forming mass, so that the viscosity of the slag can be increased and the effects of the alkali metal salts overcome.

The present invention is particularly important in the manufacture of welding electrodes and the use thereof allows, for example, the obtaining of a flat fillet of smooth appearance and an almost straight profile. The aforesaid advantage is obtained when using a fluoride-containing welding electrode, the coating of which contains 40% iron powder or more. Moreover, the present slag-forming mass has the advantage that it is less retentive of water than waterglass. Therefore, as compared with electrodes which contain waterglass in their coating, less drying is necessary to reduce the moisture content to a permissible value which generally is less than 0.5% of the weight of the slag-forming substances.

It should be furthermore noted that usually a slag-forming mass is molded into the desired form by extruding the mass prior to the drying operation. The aforesaid step can often be carried out with satisfactory results only if the mass is mixed with clay, for example, bentonite and kaoline. However, it has been found that the binder used in the slag-forming mass according to the invention renders the use of such so-called gliding means superfluous. By the use of the present invention, the composition of a fluoride-containing, slag-forming mass not only is materially improved but increases the choice and the quantity of the slag-forming substances that can be used.

Examples of the compositions made in accordance with the teachings of the present invention follows:

(1) A fine powder of magnesium fluoride was stirred with half its weight of water, and to the paste thus formed was added a quantity of magnesium chloride dissolved in water corresponding to 6% of the weight of the quantity of magnesium fluoride used. After stirring for one hour, the paste had the form of a rigid gel with a solids content of 50%. To produce a coated welding electrode, 25 parts of this gel were mixed with 25 parts of ground rutile, 3 parts of ferro-manganese powder (80% Mn), 20 parts of ferrochromium powder (70% Cr), 12 parts of calcium carbonate powder, and 30 parts of ground feldspar. A wire of stainless steel having 18% Cr and 8% Ni and a diameter of 4 mms. was coated with this paste up to a diameter of 6.5 mms. The wire was then dried at 250 C. for 20 minutes. Thus, an electrode with a rigid coating is obtained, which yields a substantially smooth weld.

(2) Very finely ground fluorspar was added to half its weight of water and 100 gs. thereof was treated in a kneading mill with 3.5 gs. of calcium chloride, dissolved in 5 mls. of water. A thick, transparent, Vaseline-like gel is obtained. On evaporating the water in this binder the weight thereof is reduced to 65% of the original weight. A welding electrode is produced in which 25 parts of the original composition thereof are mixed with 10 parts of rutile (ground), 20 parts of quartz (ground), 14 parts of manganese oxide ($Mn_3O_4$, ground), 6 parts of ferro-manganese powder (80% Mn), 2 parts of ferro-silicium powder (45% Si), and 2 parts of ferro-titanium powder (30% Ti).

This mixture was extruded through apertures having a diameter of 1.5 mms. and cut to grains, which were dried at 350° C. If a bare iron wire held in this powder is used for welding, a satisfactory welding joint is obtained with a favourable profile.

(3) 1 kg. of dry ground chalk was stirred with 840 gs. of a 48% solution of hydrofluoride acid. To this paste was added 42 gs. of calcium chloride dissolved in 62 c.cms. of water. As an alternative, 38 gs. of chalk may be admixed in addition and hydrochloride acid may be added in drops. Instead of adding calcium chloride, magnesium chloride may be added to obtain the gel. Other salts, for example, the bromides and the nitrates also produce the gel. To produce a coated welding electrode, 60 parts of a 55% gel thus produced are worked up to form a paste with 36 parts of ground chalk, 12 parts of quartz, 8 parts of ferromanganese powder (80% Mn), 9 parts of ferro-silicon powder (45% Si), 3 parts of ferrotitanium powder (30% Ti), and 100 parts of iron powder. A mild-steel wire of 4 mms. in diameter is coated by extrusion with this mixture up to a thickness of 8.4 mms. After drying for one hour at 200° C., the moisture content had been reduced to an extent such that when making a flat fillet a pore-free weld is obtained, which has a substantially smooth profile and an attractive appearance.

A welding rod prepared in accordance with the invention is illustrated by the drawing the sole figure of which is a view of a welding rod having as a center core an iron or steel wire and as the coating iron powder bound to the wire by a fluoride gel binder formed by the method of the invention.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A method of forming a binder for a slag-forming mass particularly adapted for the electrical arc welding of iron and iron alloys comprising the steps, forming an aqueous dispersion of a finely divided fluoride of an alkaline earth metal; and treating said dispersion with an aqueous solution of a water soluble salt of a metal ion which replaces the metal ion in the lattice of the dispersed fluoride, said water soluble salt being added in an amount sufficient to coagulate said fluoride to thereby form a colloidal gel of said fluoride.

2. A method of forming a binder for a slag-forming mass particularly adapted for the electrical arc welding of iron and iron alloys comprising the steps; forming an aqueous dispersion of a finely divided fluoride of an alkaline earth metal; and treating said dispersion with an aqueous solution of a water soluble salt of a metal ion which replaces the metal ion in the lattice of the dispersed fluoride, said water soluble salt being added in an amount equal to about 2% to 10% by weight of the metal of the fluoride, to thereby form a colloidal gel of said fluoride.

3. The method of claim 2 in which the amount of water used is adjusted so that the solids content of the colloidal gel is from about 40% to 80% by weight.

4. The method of claim 2 in which the aqueous dispersion of the fluoride is prepared by forming an aqueous suspension of a finely ground mineral fluoride.

5. The method of claim 2 in which the aqueous dispersion of the fluoride is prepared by treating a compound selected from the group consisting of the carbonate and hydroxide of the metal of the desired fluoride with hydrofluoric acid.

6. A method of forming a binder for a slag-forming mass particularly adapted for the electrical arc welding of iron and iron alloys comprising the steps; forming an aqueous dispersion of a finely divided fluoride of an alkaline earth metal and treating said dispersion with an aqueous solution of a water soluble salt of an alkaline earth metal ion identical with the alkaline earth metal ion present in the lattice of the dispersed fluoride, said water soluble salt being added in an amount equal to about 2% to 10% by weight of the metal of the fluoride, to thereby form a colloidal gel of said fluoride.

7. A method of forming a binder for a slag-forming mass particularly adapted for the electrical arc welding of iron and iron alloys comprising the steps; forming an aqueous dispersion of a finely divided fluoride of an alkaline earth metal and treating said dispersion with an aqueous solution of a water soluble salt of an alkaline earth metal ion different from the alkaline earth metal ion present in the lattice of the dispersed fluoride, said water soluble salt being added in an amount equal to about 2% to 10% by weight of the metal of the fluoride, to thereby form a colloidal gel of said fluoride.

8. A method of forming a binder for a slag-forming mass particularly adapted for the electrical arc welding of iron and iron alloys comprising the steps; forming an aqueous dispersion of a finely divided fluoride of an alkaline earth metal and treating said dispersion with an aqueous solution of a water soluble salt of a metal ion capable of replacing the metal ion in the lattice of the dispersed fluoride, said metal ion being selected from the group consisting of cadmium, zinc and copper, said water soluble salt being added in an amount equal to about 2% to 10% by weight of the metal of the fluoride, to thereby form a colloidal gel of said fluoride.

References Cited in the file of this patent

UNITED STATES PATENTS

| | | |
|---|---|---|
| 1,967,491 | Austin | July 24, 1934 |
| 2,009,240 | Roberts et al. | July 23, 1935 |
| 2,380,945 | Collins | Aug. 7, 1945 |
| 2,381,242 | Wood | Aug. 7, 1945 |
| 2,454,921 | Heinemann | Nov. 30, 1948 |
| 2,481,479 | Jozef ter Berg et al. | Sept. 6, 1949 |
| 2,505,291 | Lucas et al. | Apr. 25, 1950 |
| 2,507,751 | Bennett | May 16, 1950 |
| 2,755,164 | Van der Willigen | July 17, 1956 |

UNITED STATES PATENT OFFICE
CERTIFICATE OF CORRECTION

Patent No. 2,966,433                      December 27, 1960

Paul Christiaan van der Willigen et al.

It is hereby certified that error appears in the above numbered patent requiring correction and that the said Letters Patent should read as corrected below.

In the grant (only), line 1, name of inventor, for "Paul Christiaan Van der Willigan" read -- Paul Christiaan van der Willigen --; column 2, line 6, after "case" insert -- the --; line 13, after "of" insert -- alkali --; same column 2, line 19, strike out "finely".

Signed and sealed this 26th day of September 1961.

(SEAL)
Attest:

ERNEST W. SWIDER
Attesting Officer

DAVID L. LADD
Commissioner of Patents
USCOMM-DC